Figure 10:
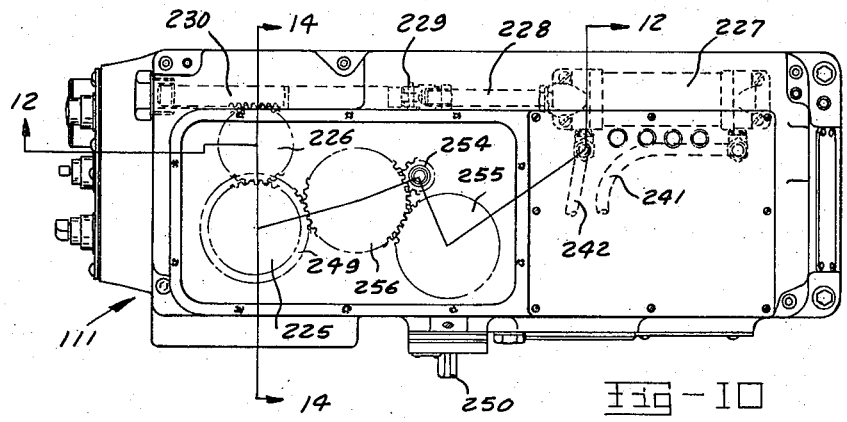

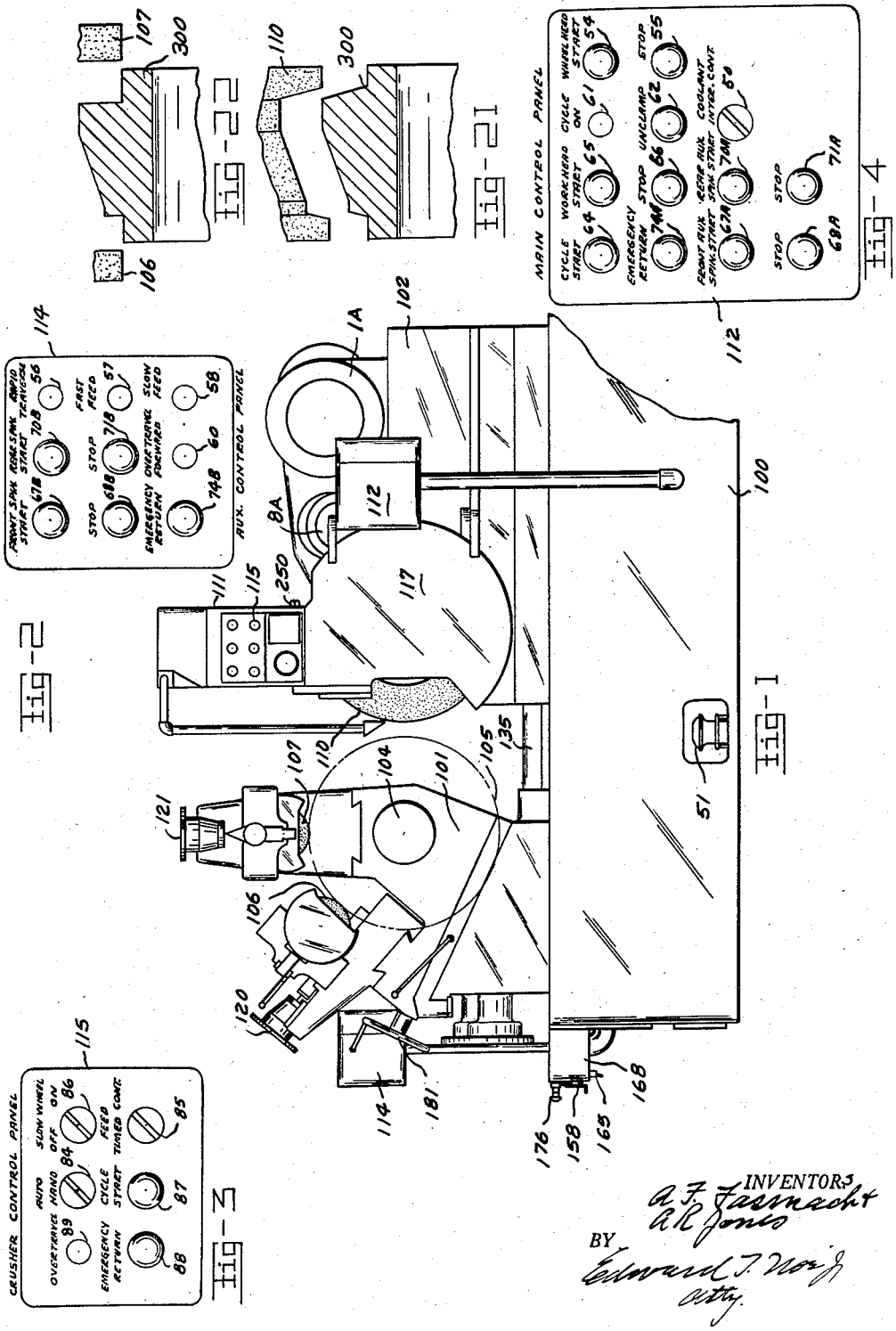

March 17, 1959 A. F. FASSNACHT ET AL 2,877,758
MACHINE TOOL
Filed Jan. 6, 1954 10 Sheets-Sheet 2
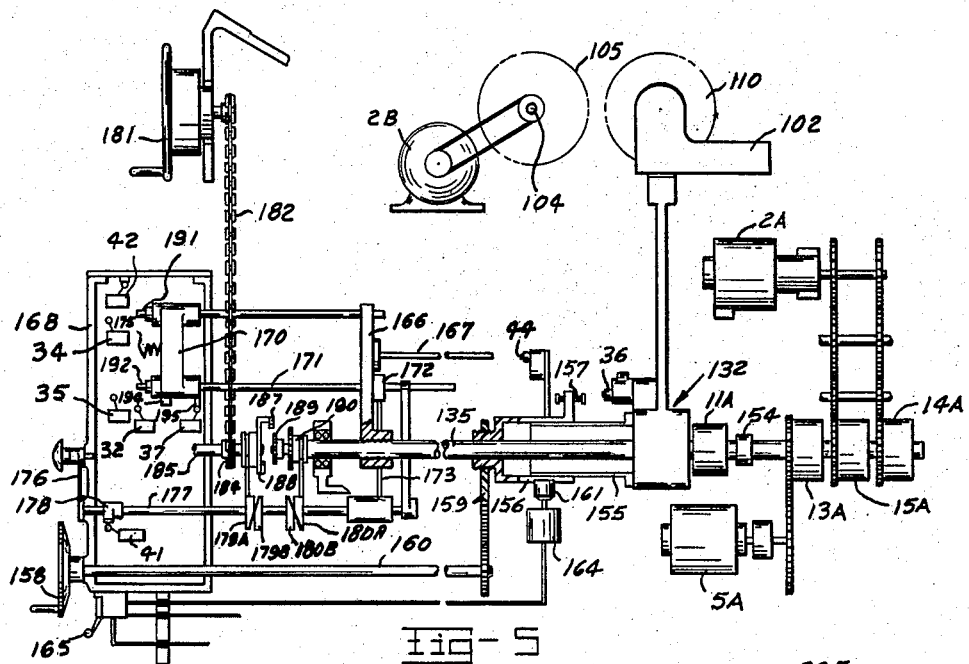
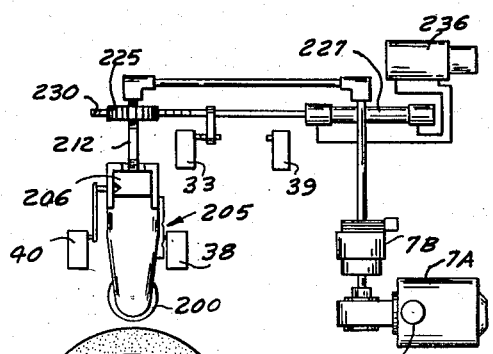
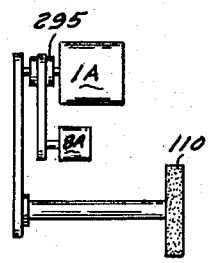
INVENTORS
A. F. Fassnacht
BY A. R. Jones
Edward T. Noe Jr.
atty

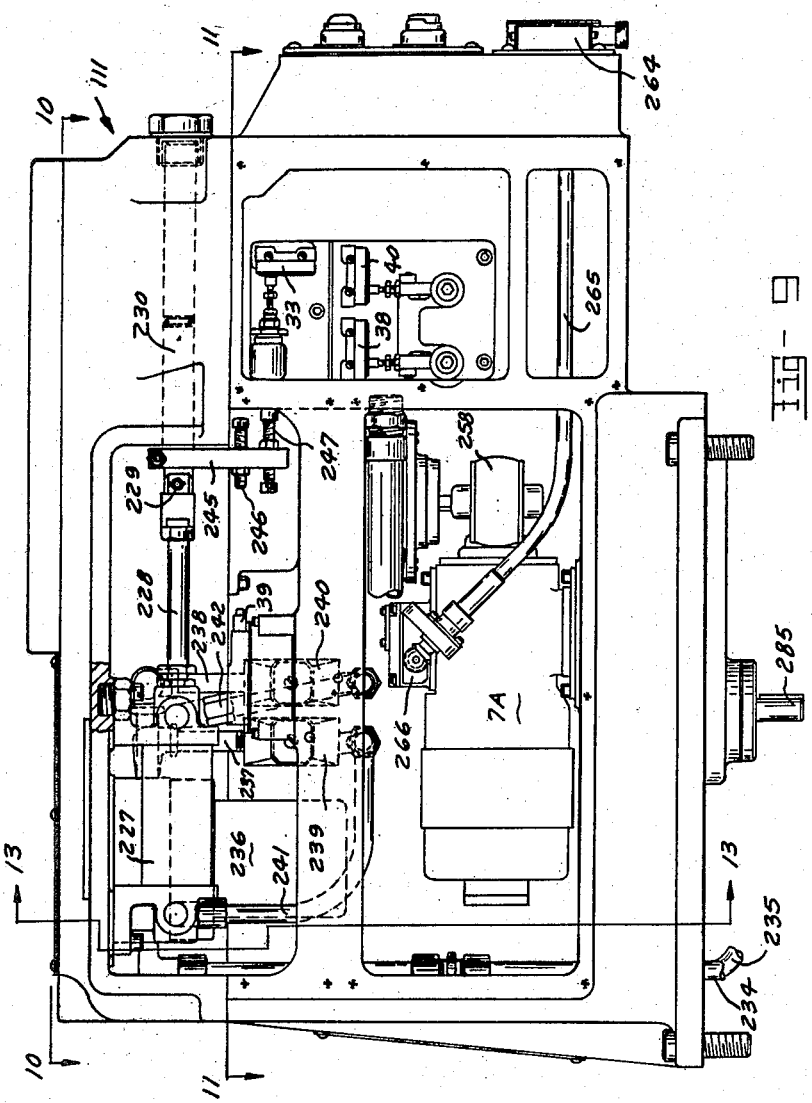

INVENTOR.
A. F. Fassnacht
L. R. Jones
BY Edward T. Noe Jr.
atty.

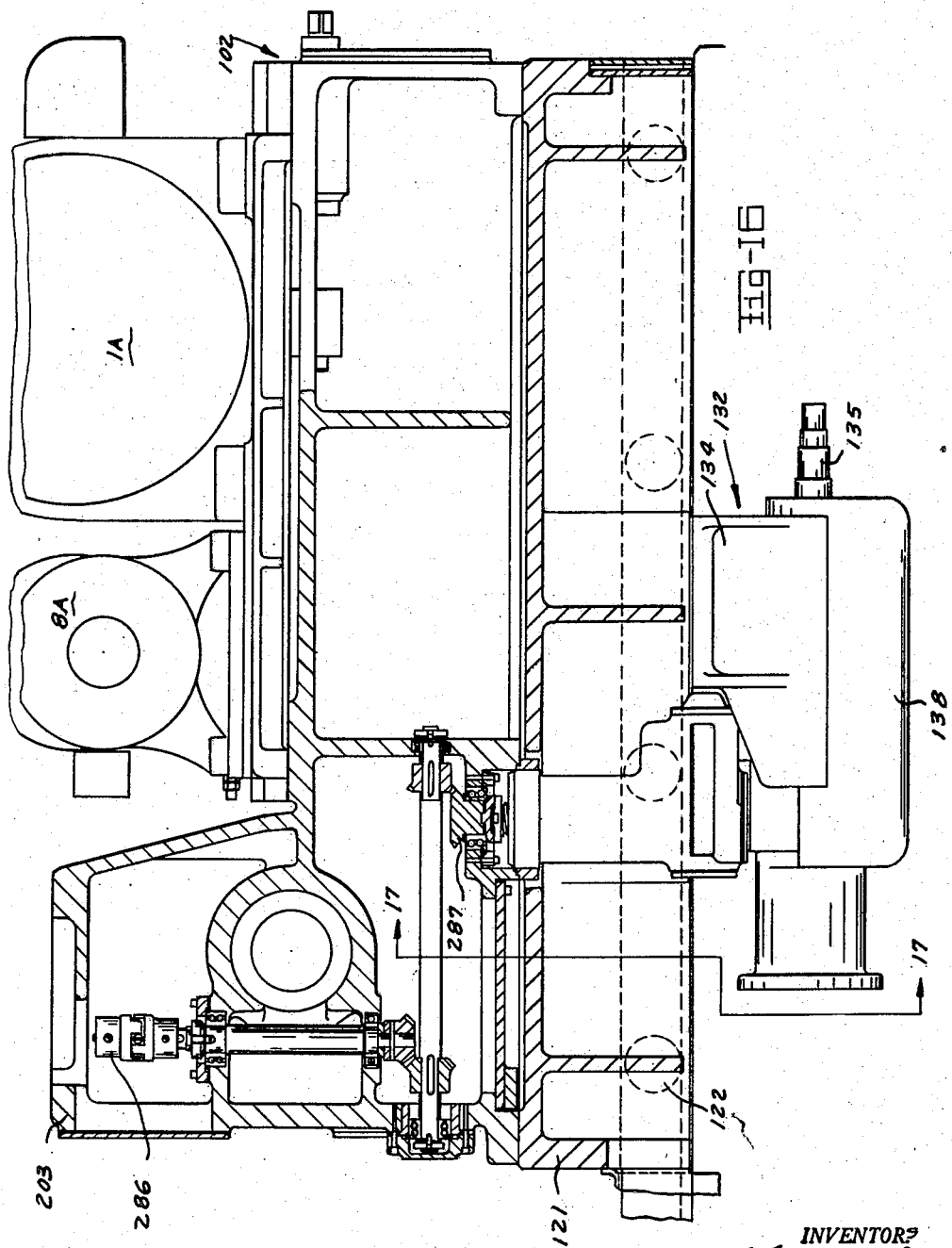

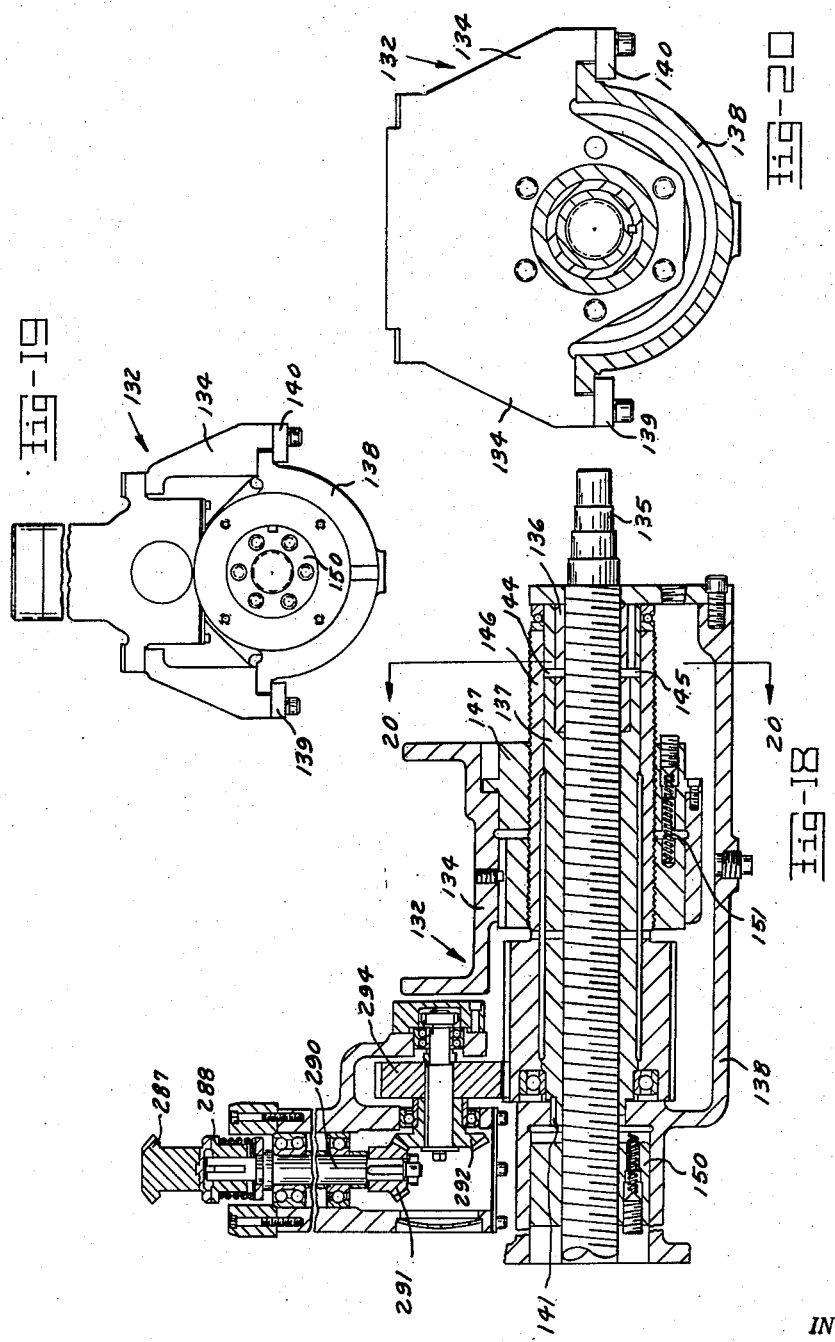

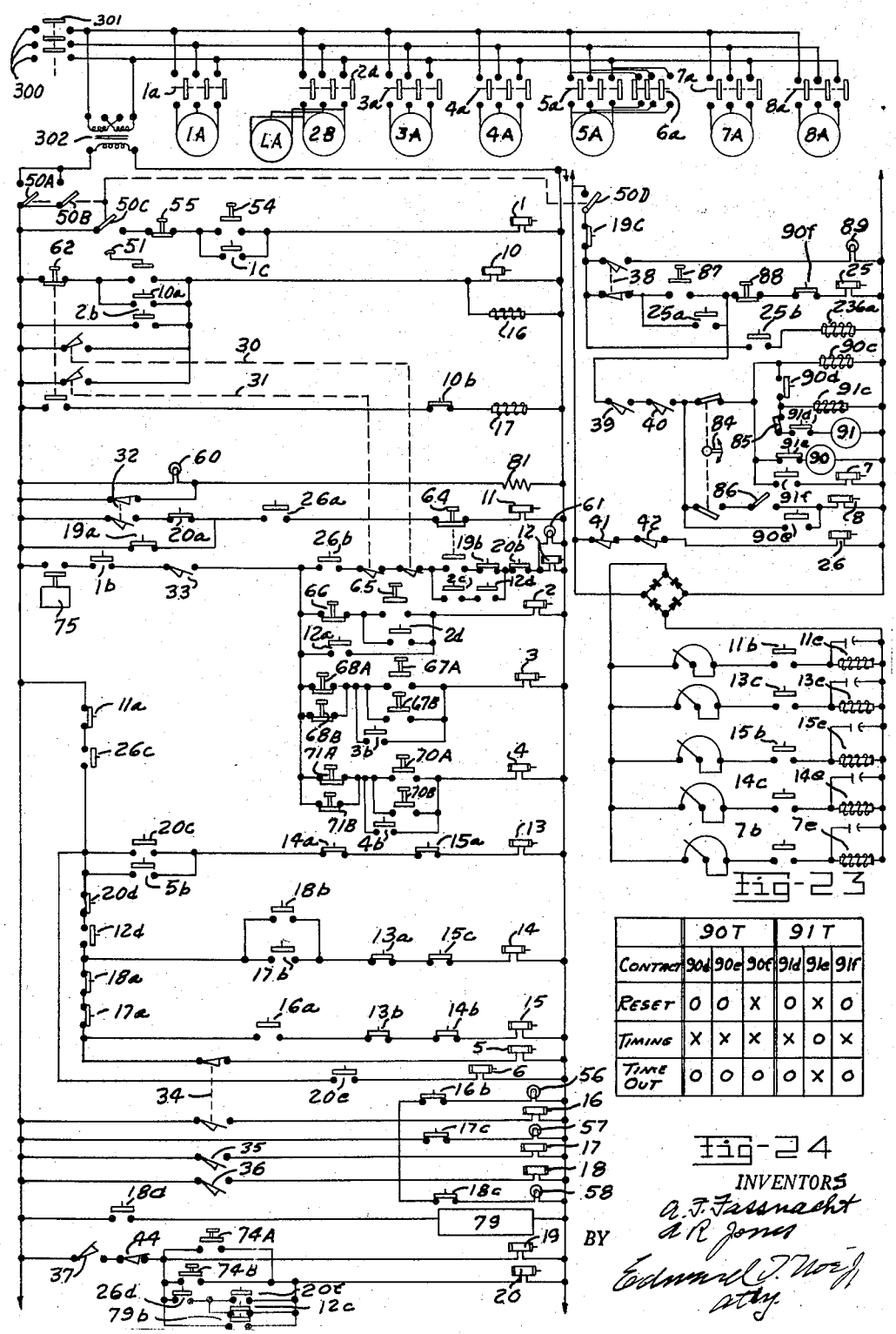

United States Patent Office 2,877,758
Patented Mar. 17, 1959

2,877,758

MACHINE TOOL

Arthur F. Fassnacht, Cleveland, and Axel R. Jones, Lakewood, Ohio, assignors to Sheffield-Cleveland Corporation, Dayton, Ohio, a corporation of Ohio Application January 6, 1954, Serial No. 402,512

14 Claims. (Cl. 125—11)

This invention relates to grinding machines and more particularly to an improved means for truing grinding wheel surfaces.

In grinding machines work locating or positioning means are provided and a driven grinding wheel is carried for engagement with the work. The periphery of the grinding wheel is annularly formed to correspond with the shape it is desired to grind into the work. In surface grinding the work and the grinding wheel are relatively reciprocated in the plane of the grinding wheel and the surface of the workpiece is formed in accordance with the annular configuration of the grinding wheel. In cylindrical grinding the work can be mounted between centers, on a rotatable work carrying spindle in a workhead or between work supports and the grinding wheel as in centerless grinding, and the work and grinding wheel brought into engagement in order to annularly form the cylindrical work. After a number of work pieces have been ground by whatever method is employed the grinding wheel begins to lose its trueness and its surface characteristics deteriorate requiring truing and resurfacing thereof.

If a suitably conformed metal crusher roll is brought into contact with the grinding wheel surface and the wheel and roll are slowly and positively forced together while rotating at a slow crushing speed a surface is crushed onto the grinding wheel and the wheel is trued and its surface refinished. Such a procedure can also be followed in initially forming a grinding wheel.

In order to precisely true a grinding wheel as quickly as possible it is desirable that the crusher roll move rapidly to and from engagement with the periphery of the grinding wheel and be slowly and positively fed for crushing. If the truing or forming cycle is either entirely or partially automatic it has been found advantageous to provide adjustments so that the duration and rate of cycle phases can be adjusted for different crushing conditions.

In grinding machines involving an automatic grinding wheel actuation it is necessary to compensate the position of the grinding wheel relative to the work locating or positioning means in accordance with the amount of its surface which has been removed in truing operations. By the use of automatic compensating structure it is not necessary to adjust or reset the automatic actuating means following each truing operation.

It is accordingly an object of this invention to provide a grinding machine for carrying out an advantageous automatic grinding cycle which includes a unit for truing the grinding wheel by means of a crusher roll wherein the truing operation can be carried out automatically or manually as desired and wherein compensating adjustments of the grinding wheel are carried out in accordance with the amount of the grinding wheel which is crushed away.

It is a further object of this invention to provide a grinding wheel truing unit wherein the entire truing operation can be carried out automatically and phases thereof are independently adjustable as to duration and rate.

It is a further object of this invention to provide a truing unit for grinding wheels wherein a grinding wheel and a crusher roll are relatively moved for crushing through an automatically timed cycle and wherein further means are provided for manually relatively moving the grinding wheel and crusher roll for crushing and truing.

It is a further object to provide a grinding wheel truing mechanism comprising a compensating drive connection operable during either automatic or manual truing for positioning a grinding wheel relative to a work positioning means in accordance with the amount of its surface which is crushed away.

It is a further object to provide a grinding wheel truing mechanism for carrying out manually a crush dressing operation and compensating means operable during the manual truing for positioning a grinding wheel in accordance with the amount of its surface which is crushed away.

It is a further object to provide a truing mechanism for grinding wheels wherein a shaft is connected to a crusher roll carrier for rapid concurrent movements of the shaft and carrier together to engage and disengage the crusher roll and the periphery of the grinding wheel upon axial movements of the shaft in opposite directions through the relative rotation of threaded components cooperating between the unit housing and the shaft, and wherein the carrier and shaft have a relative axial movement to slowly and positively feed the crusher roll into the grinding wheel surface upon rotation of the shaft through an actuating means cooperating with a splined portion of the shaft.

It is a further object to provide a crusher unit having means for rapidly moving a crusher roll into and out of engagement with the periphery of a grinding wheel by axial movements of a shaft connected to a crusher roll carrier, the shaft carrying an externally threaded and non-rotatable sleeve threaded within a nut means rotatably carried within the housing of the crusher unit.

It is a further object to provide a crusher unit as in the object next above wherein the nut means has external teeth engaged with a reciprocatable rack actuatable by a fluid operated piston or the like.

It is a further object to provide a means for slowly and positively feeding a crusher roll into the periphery of a grinding wheel for truing by rotation of a shaft held against axial movement in a crusher unit housing and fitted within a crusher roll carrier for relative axial movements therebetween upon rotation of the shaft, the shaft being driven through a longitudinally splined section along its length.

Figure 11:
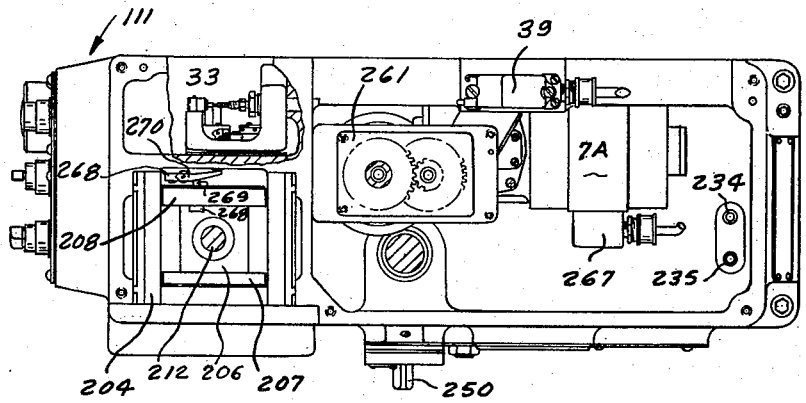
Figure 12:
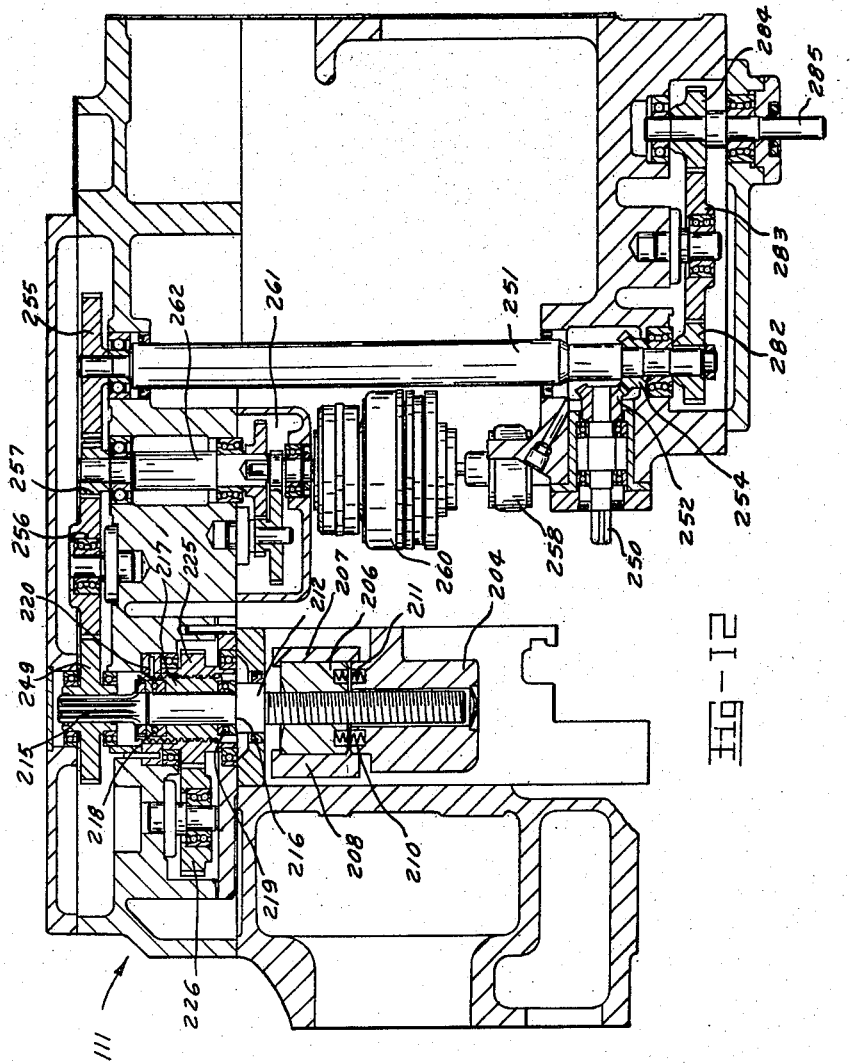
Figure 13:
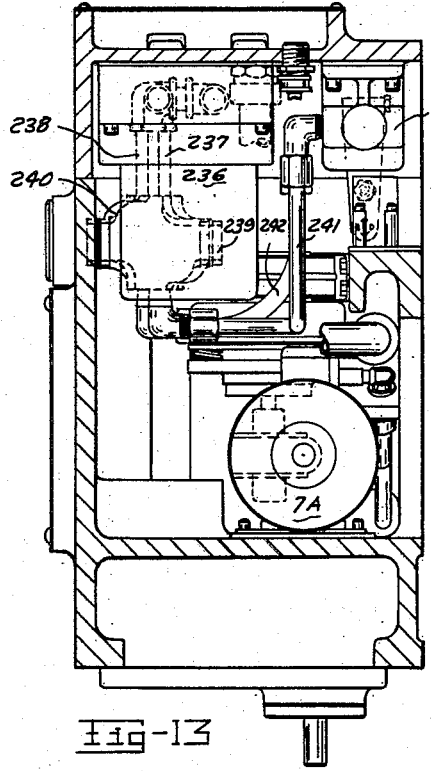
Figure 14:
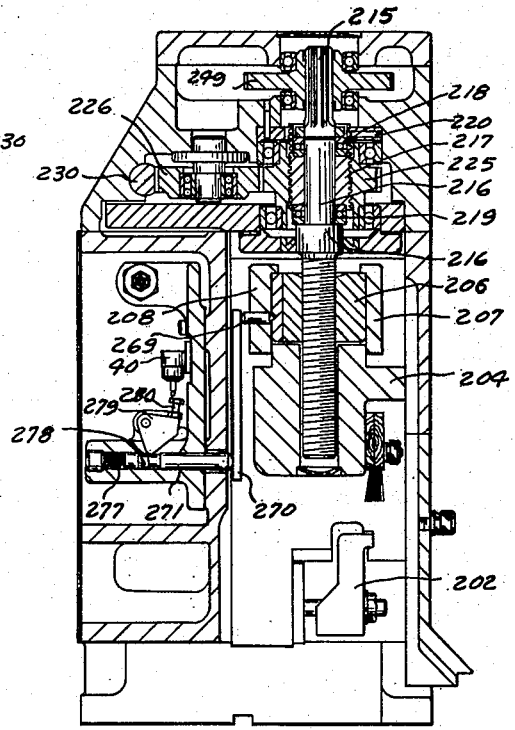
Figure 17:
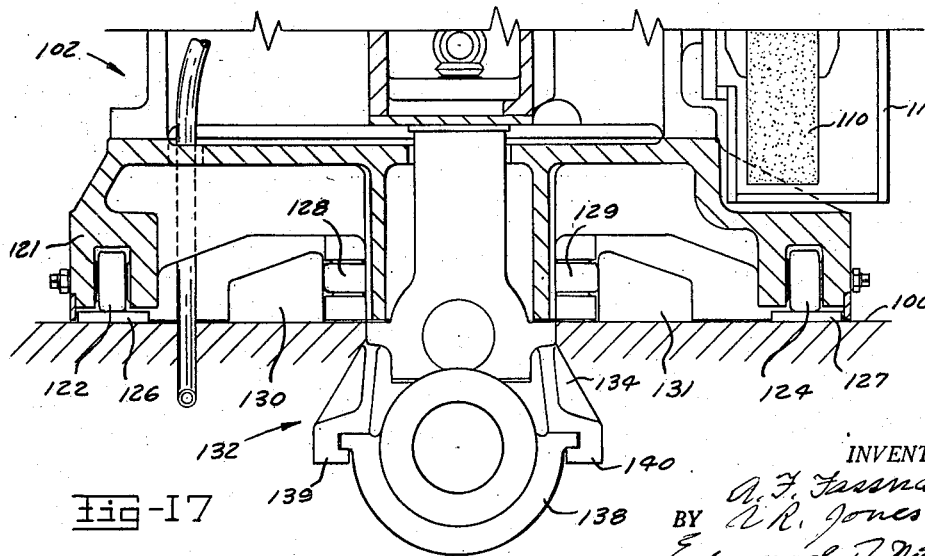
Figure 15:
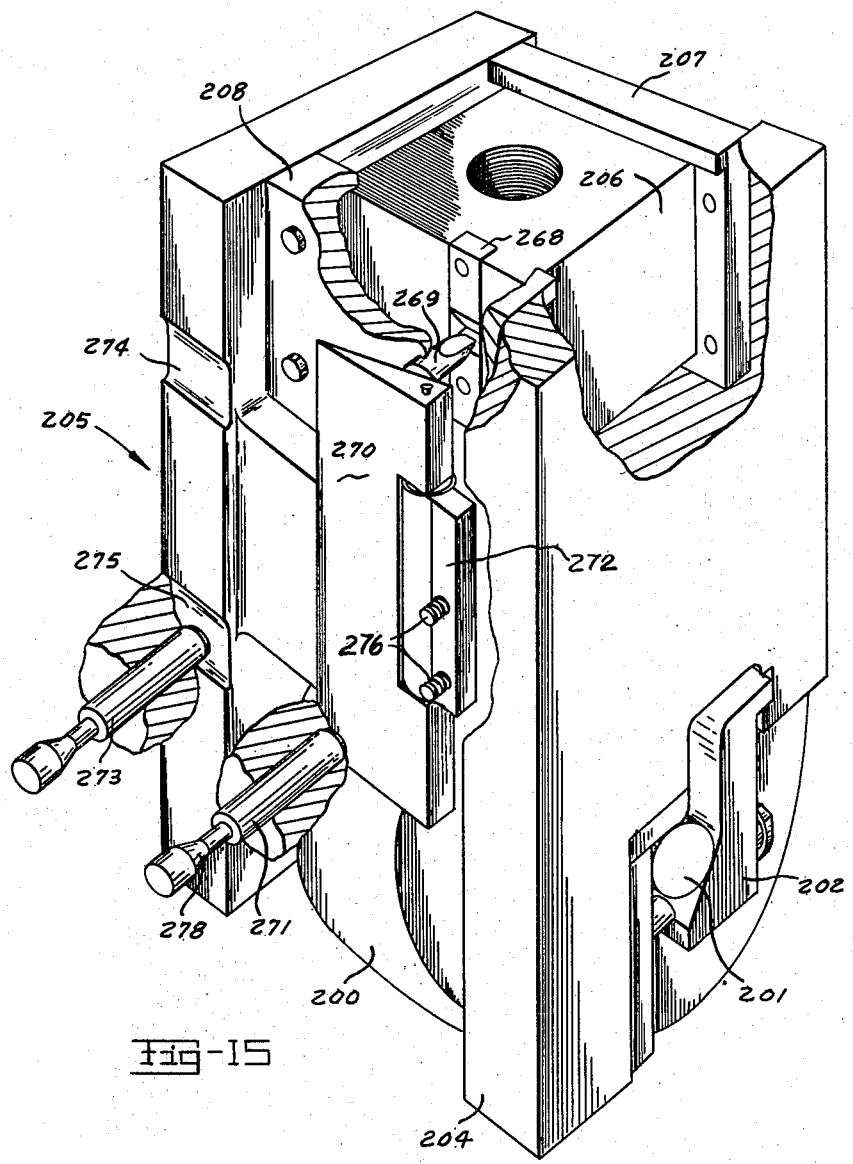

Other objects and advantages of the invention will be apparent from the following description, the appended claims, and the accompanying drawings, in which, Figure 1 is a front elevational view of an exemplary grinding machine embodying the features of the present invention, Figures 2, 3 and 4 illustrate the various control panels for the machine, Figure 5 is a diagrammatic representation of the grinding wheel actuating mechanism and the setup structure therefor, Figure 6 is a detail of a lever of the machine viewed from the lefthand face thereof, Figure 7 is a diagrammatic representation of the grinding wheel crushing structure, Figure 8 illustrates diagrammatically the drive to the grinding wheel, Figure 9 is a view of the lefthand side of the crushing assembly shown with some of the assembly covers removed, Figure 10 is a view taken on line 10—10 of Figure 9 of the upper portion of the crushing assembly with the uppermost cover removed, Figure 11 is a view taken on line 11—11 of Figure 9 showing the inner structure of the crushing assembly with its uppermost components removed, Figure 12 is a sectional view taken on line 12—12 of Figure 10, Figure 13 is a sectional view taken on line 13—13 of Figure 9, Figure 14 is a sectional view on line 14—14 of Figure 10, Figure 15 is an enlarged view of the crusher wheel carrying assembly shown in perspective, Figure 16 is a view in partial central section of the lower portion of a grinding wheel and crushing assembly supporting means which is movable toward and from the work, Figure 17 is a sectional view on line 17—17 of Figure 16, Figure 18 is a central longitudinal section of the compensating mechanism shown in elevation in Figure 16, Figure 19 is a view from the lefthand end of Figure 18, Figure 20 is a sectional view on line 20—20 of Figure 18, Figures 21 and 22 illustrate stages in a grinding operation using the exemplary machine illustrated, Figure 23 is an electrical circuit diagram for the present machine, and Figure 24 is a diagram of the contact operations involved in the timing of the crushing operation.

The particular grinding machine illustrated and which will now be described for the purpose of disclosing the features of this invention is one designed for grinding the external peripheries of shroud rings for jet aircraft engines. It is, of course, only intended for illustrative purposes and it will be apparent that the features of this invention are not restricted to such an application.

In the exemplary machine illustrated an annular shroud ring is clamped to the driven spindle of a workhead. The grinding wheel, its driving means, and the entire crushing assembly are mounted in a common assembly or wheelhead for movement upon the machine base toward and from the workhead. Automatic structure is provided for moving the wheelhead in a grinding operation with a sequential motion involving a rapid traverse forward into initial engagement with the workpiece, a fast feed to a point where the entire surface of the grinding wheel is engaged with the work, a slow feed while the major grinding operation is taking place, a dwell period for spark out or sizing and a rapid traverse return.

The truing mechanism is mounted immediately above the grinding wheel in the wheelhead. It comprises a crusher roll, its drive means, and its automatic and manual actuating structure. During the automatic truing operation the crusher roll is lowered into yielding contact with the grinding wheel surface. A lost motion connection is provided which is closed upon engagement of the grinding wheel and crusher roll. The closing of the lost motion actuates a switch to start the grinding wheel into rotation at a slow crushing speed. After the grinding wheel and crusher roll have been brought up to crushing speed together the crusher roll is slowly and positively forced into the surface of the grinding wheel to true its surface by crushing. Following a predetermined time interval the crushing movement is stopped but the grinding wheel and crusher roll continue rotating for a finishing operation. Then the crusher roll is rapidly retracted after the grinding wheel has been trued for further grinding operations.

Manually actuated means are also provided for forcing the crusher roll and grinding wheel surfaces together for truing. A connection between the automatic wheel head grinding actuating means and both the automatic and manually operated crushing structure is provided to move the wheelhead toward the work in accordance with the amount of material crushed from the grinding wheel surface. This performs a compensating function whereby following crushing the automatic cycle can be immediately carried into effect without adjustments.

Because of the nature of dressing operations by means of a crusher roll radial surfaces cannot be readily formed on a grinding wheel. In the illustrative application truly radial surfaces are desired on the finished work. The workpiece is initially ground by the crush-dressed grinding wheel and auxiliary grinding wheels have been provided to true up the radial surfaces required. The use of the auxiliary grinding wheels and their actuating structure form no essential part of the present invention.

In Figure 1 is seen the exemplary grinding machine, which comprises a base or frame 100 supporting a workhead 101 at its left hand end and a wheel head and crusher assembly 102 adjacent its righthand end for movement toward and from the workhead during a grinding operation. The workhead 101 comprises a work driving spindle 104 which is driven by a chain drive from a motor situated in the base 100. The phantom outline of an annular workpiece is indicated at 105. Auxiliary grinding wheels 106 and 107 are mounted on the workhead. These auxiliary grinding wheels are movable by manually actuated means not shown in detail in order to square up surfaces of a workpiece following the grinding operations by the main grinding wheel 110.

Each of the auxiliary grinding wheels is driven by an individual electric motor mounted on the workhead 101. The wheelhead 102 is driven for its movement to and from the workhead 101 by two electric motors, a rapid traverse motor and a slow feed motor, which are carried in the base 100 adjacent its righthand end. The grinding wheel itself is illustrated at 110 and is driven during a grinding operation by a fast speed motor 1A and during crushing by a slow speed motor 8A. The crushing assembly 111 is included in the wheelhead assembly immediately above the grinding wheel and includes the crushing feed motor 7A.

The main control panel for the machine is indicated at 112 in Figure 1 and illustrated in more detail in Figure 4. An auxiliary panel 114 is indicated in Figure 1 and is shown in more detail in Figure 2. This auxiliary control panel 114 is of particular utility while setting up the grinding cycle. A control panel for the crusher assembly 111 is indicated at 115 in Figure 1, and Figure 3 illustrates it in more detail.

The crusher roll is carried within the crusher assembly 111 immediately above the grinding wheel 110. It is not visible in Figure 1 because of the protective shield 117 carried on hinges from the wheelhead 102. The auxiliary grinding wheel 106 and 107 can be adjusted radially to accommodate different diameter workpieces by turning of the adjusting wheels 120 and 121 respectively (see Figure 1). They are manually moved axially into grinding engagement with the workpiece.

Figures 16 to 20 illustrate the lower portion of the wheelhead assembly 102 and its relationship with the machine base 100 along with details of the compensating unit and lead screw mechanism for positioning the wheelhead 102. As seen particularly in Figures 16 and 17 the wheel head assembly 102 has a lower casting 121 which supports rollers carrying the assembly 102 for its movement toward and from the workhead 101. Laterally spaced rollers 122 and 124 serve to support the weight of the wheelhead as they roll along hardened ways 126 and 127 carried from the base 100. The wheelhead assembly 102 is guided and restrained against lateral movement relative to the base 100 by rollers 128 and 129 carried from the casting 121 and engaging longitudinal guides 130 and 131 fixed to the base 100.

The compensating and feed control unit indicated at 132 moves the wheelhead assembly 102 for its sequential traverse movement in a grinding operation and serves a compensating function in conjunction with the crusher assembly 111 to be later described. The upper housing 134 of this unit 132 is fixed to the lower portion of the wheelhead assembly 102. A lower housing 138 carries the remainder of unit 132 and is guided for sliding and is held against rotation relative to the upper housing 134 by guide plates 139 and 140. A feed screw 135 is threaded within a feed nut 136 and a nut housing 137. The nut housing 137 is keyed at 141 to the lower housing 138 and is therefore held against rotation. The feed screw nut 136 is pinned at 144 and 145 in this nut housing 137 and is accordingly also held against rotation. A compensator screw 146 is threaded within a compensator nut 147 fixed to the upper housing 134 which is in turn fixed to the wheel head assembly 102 as previously noted. The spring units 150 and 151 are conventional means provided to remove backlash between the feed nut 136 and feed screw 135 and the compensating nut 147 and the compensating screw 146 respectively. The compensator screw 146 can rotate on the feed nut housing 137 and is held in the lower housing 138 by bearings at either end thereof. It therefore cannot have axial movement relative to the lower housing 138. The compensating function is only carried out when the feed screw 135 is stationary and no grinding traverse of the wheel head assembly 102 is taking place. During compensation the compensating screw 146 is rotated by drive mechanism which will be later described and there is a resulting relative movement between the upper and lower housing of the unit 132 and the wheelhead assembly 102 moves forward. On the other hand when the compensator screw 146 is held against rotation, as it is whenever it is not being positively driven during crushing, and the feed screw 135 is rotated the entire compensator and feed unit 132 is movable by the feed screw nut 136. That is to say that the feed screw nut 136, the nut housing 137, the compensator screw 146, the compensator nut 147 and the upper housing 134 of the compensating unit 132 which is fixed to the wheelhead 102 act as a unit and are advanced or retracted upon rotation of the feed screw 135.

Figure 5 illustrates diagrammatically the drive mechanism for the wheelhead assembly 102, the setup structure, the various switches which are actuated during the sequential grinding operation and their actuating contacts. Therein is seen the wheelhead assembly 102 mounting the grinding wheel 110 for movement toward and from the phantom outline of a workpiece 105. The wheelhead assembly 102 is operatively connected to the compensating and feed screw unit 132. The feed screw 135 is rotated for fast and slow advance of the unit 132 and the wheelhead assembly 102 by means of clutches 13A and 14A, driven through fast and slow speed gearing feed motor 2A. The clutch 13A is driven by a reversible rapid traverse motor 5A. These clutches are electrically actuated for advancing the wheelhead assembly 102 in a rapid traverse approach to the workpiece, a fast feed movement, a slow feed movement, and a rapid reverse traverse through the reversing of the rapid traverse motor 5A following a predetermined spark out period.

Electrically actuated brake means are provided at 11A and a slip clutch 154 serves to prevent overloading of the feed screw 135 during the spark out portion of the grinding cycle. A positive stop switch 36 is fixed to the upper housing of the compensating and feed nut unit 132. A plunger 155 is carried from the forward face of this assembly 132 and slidably supports an adjustably fixed stop sleeve 156 which carries a switch 44 and an adjustable stop 157 associated with the switch 36. This stop sleeve can be adjusted during setup as will later be described by rotation of the hand wheel 158 to turn the internally threaded gear 159 through the shaft 160. After adjustment the stop sleeve 156 is clamped by an air operated clamp 161 actuated by the pressure cylinder 164 controlled by a manually actuated valve 165. Adjacent the lefthand end of the feed screw 135 an auxiliary nut 166 is threaded thereabout which will duplicate the movements of the wheelhead assembly 102. This auxiliary nut 166 is used to carry the adjustable actuating dogs for the limit switches which in turn control the various clutches and motors for the wheelhead sequential grinding cycle. A projecting rod 167 is carried at the righthand side of the auxiliary nut 166 and is associated with the switch 44 which constitutes a stop sleeve safety switch to prevent jamming of the auxiliary nut 166 and the stop sleeve 156.

A major number of the limit switches and the setup adjusting structures are carried in a limit switch box 168 illustrated in Figure 1. Inside this compartment 168 (see Figure 5) a limit switch dog carrier 170 is positioned by a rod 171 which can be fixed to the auxiliary nut 166 to duplicate its movements by a selectively engageable cam actuated interlock mechanism 172. If the interlock mechanism 172 is released the limit switch dog carrier 170 is urged to the right to a reference position by a spring mechanism shown partially at 175. When shaft 177 is rocked through movements of selector handle 176 it actuates interlock 172 through a mechanical operating connection indicated at 173 and concurrently actuates interlock switch 41 through an interlock switch arm at 178. Switch 41 is closed when selector handle 176 is in "Run" position (see Figure 6). Shaft 177 also rotates face cams 179B and 180B of paired face cams 179A—179B and 180A—180B. The feed screw 135 can be rotated during setup operations to position wheelhead assembly 102 by turning of hand wheel 181 which drives a chain 182 engaging sprocket 184 on shaft 185. Ratchets 187 and 188 are disposed for driving in opposite directions and are slidably keyed to shaft 185 for selective engagement with ratchet gear 189 which is fixed to feed screw 135 and ratchet gear 190 which is slidably keyed thereto. Face cam 179A is slid along shaft 177 when face cam 179B is rotated and positions ratchets 187 and 188 relative to ratchet gears 189 and 190. Face cam 180A is slid along shaft 177 when face cam 180B is rotated and slides ratchet gear 190 along feed screw 135. The pairs of face cams are so conformed as to obtain desired relative movements of the ratchets and ratchet gears. With selector handle 176 in "Run" position both ratchets 187, 188 and slidable gear 190 are retracted and both ratchets are disengaged. In the "Setup" position of handle 176 ratchets 187, 188 are moved to engage ratchet 188 and ratchet gear 189 while ratchet gear 190 remains retracted, making it possible to move wheelhead assembly 102 forward only through clockwise rotations of hand wheel 181. When selector handle 176 is moved to its "Neutral" position both ratchets 187, 188 and ratchet gear 190 are moved to engage ratchet 188 with ratchet gear 189 and ratchet 187 with ratchet gear 190, making it possible to rotate lead screw 135 in either direction through hand wheel 181 and move wheelhead assembly 102 forward or backward. Selector handle 176 in "Run" position actuates interlock 172 to lock rod 171 to auxiliary unit 166; in "Setup" position the components remain locked together, and in "Neutral" they are released. Thus by actuation of handle 176 various relationships can be obtained for a setup procedure later described.

The limit switch dog carrier 170 carries an adjustably mounted rapid traverse stop dog 191 for actuating a rapid traverse stop switch 34 and an adjustably mounted fast feed stop dog 192 for actuating a fast feed stop switch 35. At the lower portion of the dog carrier 170 are a fixed dog 194 for actuating an overtravel limit switch 32 and a fixed dog 195 for actuating a return stop limit switch 37. The utility of the various switches and the setup mechanism will be later described in connection with the circuit diagram of Figure 23.

Figures 9 to 15 illustrate the crusher assembly 111 in detail. This assembly 111 is mounted on a casting 203 forming a part of the wheel head and crusher assembly 102 (see Figure 16). This casting 203 also serves to support the grinding wheel drive motors 1A and 8A. This crusher assembly 111 supports a crusher roll 200 immediately above the periphery of the grinding wheel 110. The crusher roll 200 is mounted for free rotation on a shaft 201 which is removably clamped at each end by fixtures, one of which is indicated at 202 in Figure 15, to the main support member 204 of a carrier assembly 205. This main support member 204 is carried for vertical sliding in the crusher assembly 111. The main support 204 is supported and moved by means of a nut 206. This nut 206 is mounted within the main support 204 by side plates 207 and 208 which have inwardly turned flanges at their upper ends. The nut 206 is carried within these flanges for some vertical lost motion and the main support 204 and nut 206 are biased apart by springs 210 and 211 shown in Figure 12. The carrier assembly 205 is actuated through the nut 206 for its vertical movement by actuating structure including a shaft 212 which is threaded at its lower end with nut 206. This shaft 212 is carried for rapid vertical reciprocation in the crusher assembly 111 to rapidly engage and disengage the crusher roll and grinding wheel. The shaft 212 is also rotatable by drive means to be later described for slow positive crushing movement of the crusher roll.

The shaft 212 is longitudinally splined at its upper end as indicated at 215 and an externally threaded sleeve 217 is carried between bearings coaxially with the shaft 212 intermediate this splined section and a shoulder 216 immediately above the threaded lower portion of the shaft 212. This sleeve 217 is carried for axial movement with the shaft 212 by bearings 218 and 219 at the ends of the sleeve. The sleeve 217 is held against rotation relative to the crushing assembly 111 by a pin 220 (see Figure 12) which extends into a longitudinal groove through the upper few threads of the sleeve 217. Accordingly the sleeve 217 when moved axially will also carry the shaft 212 with it but is held against rotation in the crusher housing. An internally threaded spur gear 225 held in bearings against axial movements is threaded about the external threads of the sleeve 217. By rotation of gear 225 the externally threaded sleeve 217 will be moved axially carrying the shaft 212 therewith. A gear 226 meshes with the internally threaded actuating gear 225 and is in turn rotated by a rack 230 reciprocated by a piston (see Figures 9 and 10).

The piston is housed within a cylinder 227 and actuates a rod 228 linked at 229 to the rack 230. It will be seen that upon movement of the piston in the cylinder 227 the rod 228 will be longitudinally reciprocated to actuate the rack 230, the gear 226 and the internally threaded gear 225 to longitudinally move the externally threaded sleeve 217 and the actuating shaft 212. This will result in vertical reciprocations of the carrier assembly 205 to move the crusher roll 200 rapidly toward and from the periphery of the grinding wheel 110 through the same predetermined displacement in each instance. When the rack 230 is extended the crusher roll 200 is raised.

Air supply and return conduits 234 and 235 pass up through the crusher assembly 111 (see Figure 9) and are connected to a solenoid actuated valve unit 236 suspended from an intermediate transverse section of the crusher assembly 111. Air passes through pipes 237 and 238 from this valve unit 236 to adjustable speed control valve units 239 and 240. Conduits 241 aund 242 lead from the speed control valve units to each end of the cylinder 227. The valve 236 is actuated by a spring loaded solenoid and meters air under pressure to one end or the other of cylinder 227 to extend or retract rod 228 and raise or lower the crusher roll carrier assembly 205. The speed control units 239 and 240 serve to allow independent control of the speed of extension and retraction.

In Figure 9 is shown an arm 245 which is fixed to the rack 230 just beyond the link connection 229 to the rod 228. This arm carries adjustable switch contacts 246 and 247. When the rack is retracted the contact 246 will engage a switch 39 and when it is extended the contact 247 will engage a rod extending through an intermediate wall of the crusher assembly 111 to actuate a switch 33 all for purposes later described.

A gear 249 carried in the crusher assembly 111 at the upper end of the shaft 212 has internal splines which mate with the splined section 215 of the shaft 212 allowing vertical reciprocation of the shaft 212 within the gear 249. This gear 249 is driven through an intermediate gear train either manually or from an adjustable speed electric motor to rotate the shaft 212 and raise and lower the crusher carrier assembly 205 by means of the feed nut 206 into which shaft 212 is threaded at its lower end. The driving gear train is shown as viewed from above in Figure 10 and is shown in a spread section in Figure 12. A square end shaft 250 extends from the righthand side of the crusher assembly 111 as seen in Figure 1 and is adapted to be used with a handle for manual crushing movement of the carrier assembly 205. This shaft 250 drives a vertical shaft 251 through mating bevel gears 252 and 254. The shaft 251 and the various gears constituting the drive components are supported in bearings in the crusher assembly housing. A gear 255 is fixed to the upper end of the shaft 251 and engages a gear 256 seen in Figure 10 which in turn meshes with the gear 249 splined to the shaft 212. It will thus be seen that upon manual rotation of the shaft 250, the crusher wheel carrier assembly 205 will be vertically moved.

A smaller gear 257 also meshes with the gear 256, and this gear 257 is adapted to be power driven. An electric motor 7A is mounted adjacent the lower portion of the crusher assembly 111 (see Figures 7 and 9). It drives through a variable speed transmisison and a right-angle transmission unit 258 through a vertically disposed solenoid actuated clutch unit 260. From the clutch unit 260 the drive is through a reducing gear assembly 261 to a vertical shaft 262 and to the small gear 257 previously referred to.

The clutch 260 is disengaged when the manual crushing operation is carried out to relieve the manual drive from driving back through the clutch, the electric motor and the intermediate transmission components. When the crushing operation is carried out under power from the electric motor 7A the manual drive means will also rotate. A manual adjustment 264 is provided at the forward face of the crusher assembly 111 and is connected through a flexible shaft 265 to adjust a variable speed transmission control unit 266 of a commercially available type mounted in the casing of motor 7A as indicated in Figure 9. The electric motor 7A is controlled through a solenoid actuated switch unit shown at 267 in Figure 11 mounted at the side of the motor 7A.

Figure 15 illustrates the mechanism for controlling the carrier actuating structure in accordance with the movements of the carrier 205. The nut 206 which is carried for some lost motion relative to the carrier assembly 205 has a notched insert 268 fixed to one side thereof. A plunger element 269 is carried for reciprocation in one side wall of the main support 204 and has a pointed inner end engaging the notch of the insert 268. At its outer end the plunger 269 engages a plate 270 hinged to a support 272 fixed by screws 276 to a side wall in the crusher assembly 111. An outer plunger 271 carried for reciprocal sliding in a wall of the crusher assembly 111 engages the hinged plate 270 adjacent its lower end. It will be seen that when the lost motion is taken up or extended with corresponding movement of the nut 206 relative to the main support 204, hinge 207 will be pivoted to actuate the lower plunger 271. The upper plunger 269 can slide along the plate 270 as the carrier assembly 205 moves up and down within the crusher assembly but will remain in actuatinug contact with the hinged plate 270. The main support 204 has two depressed portions 274 and 275 along its lefthand outer face as seen in Figure 15. A second lower plunger 273 is also carried for axial reciprocation in a wall of the crusher assembly 111 and engages the lefthand face of the main support 204. Plunger 273 will move inward when the carrier 205 is positioned with either of the depressed portions 274 or 275 facing the inner end of the second lower plunger 273.

In Figure 14 is shown the manner in which the lower plunger 271 actuates its associated switch. A spring 277 biases the plunger 271 inwardly into engagement with the hinged plate 270 and also keeps the plunger 269 biased into engagement with the insert 268. The plunger 271 has a conical camming surface 278 intermediate its length which engages a ball crank plate 279. It will be seen that upon inward movement of the plunger 271 the plate 279 will be swung upward to engage its adjustable abutment 280 with the contact of switch 40. Thus when the crusher roll 200 engages the grinding wheel the lost motion between the nut 206 and main support 204 is taken up, the plunger 269 drops into the notch of the insert 268, and the ball crank 279 is swung upward to operate the switch 40. Conversely, the plunger 269 is forced out of the notch when the lost motion is spread upon the lifting of the nut 206 and the contact 280 will drop away from this switch 40. A similar switch actuating structure for switch 38 is situated immediately behind that illustrated in Figure 14 and is operated in accordance with movements of the second lower plunger 273 (see also Figure 9).

Thus it is seen that the carrier assembly 205 when in its raised position is supported as by hanging upon the nut 206. When this nut is rapidly lowered upon outward movement of the rack 230 the crusher roll 200 will engage the surface of the grinding wheel 110 and the lost motion will be taken up as the nut 206 moves relative to the main support 204. During the taking up of the lost motion, the plunger 269 will move into the notch in the insert 268 of the nut 206 and actuate its associated switch 40. Concurrently, upon the outward reciprocation of the rack 230 the contact 247 carried by the arm 245 from the rack 230 will actuate switch 33. The notches 274 and 275 constitute lower and upper limit means respectively for the carrier assembly 205 and when the carrier has been lowered to the overtravel limit the plunger 273 will fall into the depression 274, actuating the switch 28. At the upper position of carrier 205 the plunger 273 will engage the depression 275 and establish maximum upper position of the crusher roll carrier assembly 205 through actuation of switch contacts as later described.

The association of the crusher actuating means and the compensating assembly previously described will now be explained. The long vertical shaft 251 is rotated during positive crushing of the grinding wheel under either manual or power energization. At the lower end of this shaft 251 a gear 282 is fixed which drives through gear 283 to gear 284 which is fixed to a shaft 285 extending through the lower portion of the crusher assembly 111.

As was previously described this crusher assembly 111 mounts immediately above the casting 203 as seen in Figure 16. The shaft 285 is fixed to a coupling 286 and drives through a chain of bevel gears and an intermediate shaft to a final bevel gear 287. This bevel gear 287, which is rotated whenever a crush dressing operation is taking place, drives through a spring loaded coupling 288 (see Figure 18), a shaft 290 and bevel gears 291 and 292 to a spur gear 294. This spur gear 294 engages extended gear teeth formed integrally on the exterior forward portion of the compensating screw 146. Compensating screw 146 is held against axial movement relative to the feed screw 135 when the feed screw 135 is not rotating and as the compensating screw 147 rotates in engagement with the compensating nut 147 which is fixed to the upper compensating housing 134 it will move this housing longitudinally relative to the feed screw 135 and position the entire grinding wheel assembly toward the work head 101, thus compensating its position toward the workpiece in accordance with the amount of material crushed from the surface of the grinding wheel 110. Thus after each crushing operation the grinding wheel has been positioned towards the workpiece 105 in accordance with the decrease in its radial dimension by crushing and no further adjustments are required before another automatic grinding operation is carried out. Were such a compensation feature not provided, it will be seen that the workpiece would not be ground to the desired dimension and that this dimension would be in error by the diminished radius of the grinding wheel through crushing.

In Figure 8 is illustrated diagrammatically the drive system for the grinding wheel 110. A slow speed grinding wheel motor 8A drives the grinding wheel 110 and also rotates motor 1A through an overrunning clutch unit 295 on the shaft of motor 1A. The fast speed motor 1A drives the grinding wheel 110 through the overrunning clutch 295 and when the fast speed motor 1A is energized it drives the grinding wheel 110 without carrying the load of the slow speed motor 8A.

In view of the preceding description of the mechanical components and the various switches which they actuate and with reference to Figures 2, 3 and 4 wherein the manually actuated switches and various signal lamps are shown the following description of the electrical circuits of Figure 23 for carrying out the grinding and crushing operations is now in order.

Electrical energy is supplied to main line leads 300 and through a main line switch 301. The various motors used in the grinding and crushing operations are energized directly from this main line. A control circuit is energized through a transformer 302 connected across a pair of the main line leads. In general, in the following description control relays have been numbered by whole small numbers, the switches which they actuate by the same numbers with small letter suffixes and the motors which they control by the same numbers with large letter designations.

There are three control panels for the grinding machine, a main control panel 112, an auxiliary control panel 114, and a crusher control panel 115. The main control panel 112 is located at the right front of the machine as seen from Figure 1 and the control buttons and selector switches on this panel act as a master electrical control for the machine. This main control panel includes a grinding "Cycle Start" switch 64, workhead "Start" and "Stop" switches 65 and 66, wheelhead "Start" and "Stop" switches 54 and 55, an "Emergency Return" switch 74A (which is duplicated on the auxiliary control panel at 74B), and "Unclamp" switch 62 for the work holding fixture and front and rear auxiliary grinding wheel "Start" and "Stop" switches indicated at 67A, 68A, 70A and 71A. The main control panel also includes a lamp 61 which is lit when the grinding cycle is in progress and a "Main Control" switch 50 which is positioned to "Crush" or "Grind." The auxiliary control panel 114 contains lights 56, 57 and 58, all of which are lit when the cycle is started. As the sequential grinding movements are completed, the lights go out in turn. The rapid traverse light 56 goes out when this movement is completed and the fast feed light 57 is extinguished after the fast feed movement has been accomplished. The slow feed light 58 goes out at the end of this movement and if the movement should be carried into over travel, the over travel forward light 60 will be lit.

Before the automatic cycle can be carried out the auxiliary grinding wheels must be retracted away from the work 105 to close the lower contacts of switches 30 and 31. The crusher assembly carrier 205 must be in its upper position, closing switch 33. A safety relay 26 (shown at the righthand central portion of Figure 23)

must be also energized by closing of the cover switch 42 and by closing of the interlock switch 41. The switch 42 is closed when the cover is placed on switch compartment 163. The safety relay 26 actuates and closes switch contacts 26a, 26b, 26c and 26d for purposes which will become later apparent. The main control switch 50 must be in "Grind" position and when so located it closes contacts 50B and 50C. Contact 50B closes to energize the control circuit and 50C closes a contact in a circuit to the fast wheelhead motor relay 1. When the wheelhead "Start" button 54 is pressed and released it energizes relay 1. This relay in turn actuates switches 1a, 1b and 1c. Switch 1a closes to energize fast wheelhead motor 1A and starts the grinding wheel 110 into rotation. Switch 1b closes a contact in the circuit to the cycle start relay 12 and to relays 2, 3 and 4 but does not energize these relays because of other open switches. Switch 1c maintains a holding circuit around switch 54. Before the cycle can be started the wheelhead motor 1A must be thus energized and a pressure switch 75 which is closed by the clamping pressure that holds the workpiece 105 in position must also be engaged.

An air operated fixture mounted on the front of the wheelhead spindle 104 is actuated by a foot operated clamping switch 51 located at the front of the machine and by the "Unclamp" switch 62 mounted on the main control panel 112. The pressure switch indicated at 75 in the circuit diagram of Figure 23 is provided to insure that the work is positively clamped. The switch is interlocked with the cycle start relay 12 so that if the clamping pressure is below the required pressure the workhead motor will not start and the cycle cannot be carried out. The foot operated switch 51 is closed by the operator and relay 10 is energized to actuate and close switches 10a and 10b. Switch 10a closes in a holding circuit around switch 51; switch 10b is an interlock switch which opens the circuit to an unclamp valve solenoid 17 disabling it during automatic operation. When switch 51 is closed clamping valve solenoid 16 is energized to supply clamping pressure to the clamping fixture.

With these conditions accomplished the "Cycle Start" switch 64 is pressed and released to start the grinding cycle. This cycle is automatic and consists of the following wheelhead movements: rapid traverse forward, fast feed, slow feed, dwell or spark out, and rapid traverse return. The upper contacts of the switch 64 are opened, deenergizing brake relay 11 and opening switch 11b to deenergize solenoid 11e and release brake 11A. The lower contacts of switch 64 are closed when the switch is depressed. Relay 12 is then energized and cycle light 61 comes on. Relay 12 in turn actuates switches 12a, 12b, 12c and 12d. Switch 12a energizes relay 2 which actuates switches 2a, 2b, 2c and 2d. Switch 2a energizes feed motor 2A and the workhead motor 2B. Switch 2b closes in a safety circuit to relay 10 and clamp valve solenoid 76 around the contacts of the "Unclamp" switch 62. Relay actuated switch 2c, closes one contact in a holding circuit around the lower contact of "Cycle Start" switch 64. Switch 2d is a holding switch around the workhead "Start" switch 65. Switch 12b which is closed by relay 12 energizes relay 5 which in turn actuates switches 5a and 5b. Switch 5a energizes the rapid traverse motor 5A for forward drive and switch 5b energizes rapid transverse clutch relay 13. Relay 13 actuates switches 13a, 13b and 13c. Switch 13a opens the slow feed clutch circuit to slow feed clutch relay 14 and switch 13b opens the fast feed clutch circuit to fast feed relay 15. Switch 13c energizes a solenoid 13e to engage the rapid traverse clutch 13A. Switch 12c opens the circuit to return relay 20. Switch 12d is also in the holding circuit around the lower contacts of the "Cycle Start" switch 64 and switch 19d and when closed completes this holding circuit. Thus the cycle is started and the grinding wheel proceeds in its rapid traverse movement toward the workpiece. As soon as the grinding wheel assembly starts its forward movement return stop switch 37, which is initially open, closes. Closed switch 37 energizes relay 19 to open switch 19a (maintaining the brake 11A released), and open switches 19b and 19c.

It will be noted that the rapid traverse light 56, fast feed light 57 and slow feed light 58 are all lighted.

When the rapid traverse stop dog 191 engages the rapid traverse stop switch 34 it opens the upper contact thereof and closes the lower contact. When the upper contact of switch 34 is opened it deenergizes relay 5, opening switches 5a, 5b, thus stopping the energization of the rapid traverse motor 5A and deenergizing relay 13. With relay 13 deenergized switches 13a and 13b are closed to the slow feed clutch relay 14 and the fast speed relay 15. The clutch solenoid 13e for the rapid traverse clutch 13A is also deenergized through the opening of switch 13c to disengage this clutch. The closing of the lower contact of the switch 34 energizes relay 16. Relay 16 closes switch 16a to the fast feed relay 15 which in turn actuates switches 15a, 15b and 15c. Switch 16b opens, extinguishing the rapid traverse light 56 to indicate that that phase of the cycle has been completed. Switch 15a also opens the circuit to rapid traverse relay 13. Switch 15b closes the circuit to solenoid 15e thus engaging the fast feed clutch 15A. Switch 15c in the circuit to the slow feed relay 14 is opened by relay 15. The feed motor 2A, which is in continuous rotation once the cycle is started, then drives through fast feed clutch 15A to move the grinding wheel during its fast feed travel while in engagement with the workpiece 105. At this stage of the cycle the fast feed light 57 and the slow feed light 58 are still lit.

At the limit of the fast speed portion of the grinding cycle, the fast speed dog 192 will engage the switch 35 closing its contact. Switch 35 energizes relay 17 which in turn actuates switches 17a, 17b and 17c. Switch 17a opens in a circuit leading to the fast feed clutch relay 15 and forward rapid traverse motor relay 5. Switch 17b closes to relay 14 actuating switches 14a, 14b and 14c. Switch 17c opens in a circuit to the fast feed light and this light goes out indicating that the fast feed portion of the cycle has terminated. When the switch 14a is actuated by the relay 14, it opens the circuit to the rapid traverse clutch relay 13. This releases and closes switch 13a completing the circuit to the slow feed clutch relay 14. Switch 13b closes to the relay 15 for the fast feed actuation but this circuit is maintained open by the switch 14b which is also actuated by relay 14. Switch 13c opens and deenergizes solenoid 13e to disengage rapid traverse clutch 13A. The relay 14 closes the switch 14c energizing the solenoid 14e and actuating the slow feed clutch 14A. With the feed motor 2A in continuous operation this carries the grinding wheel through the slow feed portion of its grinding cycle.

The amount of slow feed movement is determined by the position of the plunger 155 relative to the stop sleeve 156 which is clamped against movement by air operated clamp 161. When these components close together further inward movement of the wheel head 102 is prevented and the slip clutch 154 connected to the lead screw 135 slips. The positive stop contact 157 carried from the stop sleeve 156 engages the switch 36 a fraction of an inch before the plunger 155 bottoms in the stop sleeve 156 and closes switch 36 energizing relay 18. Relay 18 opens switch 18a in the fast feed clutch and rapid traverse motor circuits, closes switch 18b in the slow feed clutch circuit, closes switch 18d to timer 79 and opens switch 18c to the slow feed light 58.

After a predetermined length of time during which the desired amount of spark out of the grinding wheel is accomplished, the timer 79 momentarily closes switch 79b energizing relay 20. Relay 20 controls six switches, 20a, 20b, 20c, 20d, 20e and 20f. Switch 20a opens in an open circuit to the brake relay 11. Switch 20b opens the circuit to the cycle start relay 12 and deenergizes cycle light 61 to indicate that the grinding cycle has terminated. Switch 20c closes and energizes relay 13 to actuate the rapid traverse clutch 13A. Switch 20d opens to disable the slow and fast speed clutch circuits and switch 20e closes to relay 6 which in turn actuates switch 6a to energize the rapid traverse motor 5A in a reverse direction. Switch 20f is also closed to maintain the circuit to relay 20. This starts the grinding wheel and crusher assembly as a unit in the reverse direction at a rapid traverse rate.

The return stop projection 198 is situated to engage switch 37 and control the return portion of the grinding cycle. The opening of switch 37 at the end of the reverse rapid traverse stops the rapid traverse motor, deenergizes the rapid traverse clutch and energizes the brake 11A. When the switch 37 opens, it deenergizes relay 20, opening switches 20c and 20e and 20f and closing switches 20a, 20b and 20d. As the dog carrier 170 retracts, the other switches return to their original positions as it moves away from them. The opening of switches 20c and 20e deenergizes the rapid traverse clutch 13A and the reverse leads to rapid traverse motor 5A. Relay 19 is also deenergized and switch 19a is closed in a circuit leading to the brake relay 11 to engage brake 11A. Switch 19b closes in the circuit to the cycle start relay and the cycle light 61 but other switches open to extinguish light 61. Switch 19c is also closed to the crusher circuit. Thus the grinding wheel assembly 102 has been returned away from the workpiece and is in condition for another automatic cycle.

The overtravel limit switch 32 is used to prevent the limit switch dog carrier 170 from crashing into the housing of compartment 168. When this limit switch is actuated the slow feed clutch 14A is deenergized, the electric brake 11A is energized and the wheelhead movement stops. This condition can be caused if the feed mechanism is improperly set up. When the overtravel forward switch 32 as shown in the circuit diagram of Figure 23 is actuated it opens its upper contact in a parallel circuit around the overtravel forward light 60 to the resistor 81 and light 60 lights because current is not paralleled around it. The lower contacts of switch 32 close, energizing relay 11 which in turn actuates switches 11a and 11b. When 11a is actuated by the relay 11 it is opened to stop the slow feed forward movement. The switch 11b closes energizing, the solenoid 11e and actuating the brake 11A.

A stop sleeve safety switch 44 is provided so that the auxiliary nut 166 cannot jam into the stop sleeve 156 during the automatic cycle. When it is contacted by the rod 167 carried by the auxiliary nut 166, switch 44 is actuated. When this switch 44 is actuated it opens the circuit to relays 19 and 20, stopping the feed and applying the brake 11A.

Emergency "Return" switches 74A (on the main control panel 112) and 74B (on the auxiliary control panel 114) are provided to return the wheelhead assembly 102 whenever it is desired or when its movement has been stopped by one of the automatically actuated mechanisms. When either of these switches are closed they energize relay 20 with the results as previously described. This accomplishes the energization of the rapid traverse clutch 15A and the reverse traverse circuit to the rapid traverse motor 5A. Whenever either of the "Emergency Return" buttons 74A or 74B are depressed they return the wheelhead assembly 102 rapidly to its rearward position.

The controlling circuit for the crusher operation is disclosed in the upper righthand portion of Figure 23. This circuit in conjunction with the mechanical components of the crusher assembly 111 previously described enables the carrying out of the crushing operation either manually or automatically.

Two timing assemblies of commercially available types designated for the purpose of this description as 90T and 91T are involved. These timers are of conventional construction and comprise timer motors 90 and 91 and timer clutch coils 90c and 91c respectively. The timers 90T and 91T control contacts in the crusher circuit. Timer 90T controls contacts 90d, 90e and 90f. Timer 91T controls timer contacts 91d, 91e and 91f. The closing of each contact can be controlled as to duration and relationship with respect to the actuation of the other contacts. The actuation of these contacts is shown in Figure 24 where the X designations indicate that the corresponding contacts are closed for a period during that timer condition. It will be noted that each timer has three conditions, "Reset," "Timing" and "Time Out." When the clutch of the respective timer is energized the timer contacts go in from the "Reset" to the "Timing" condition. If the motor is energized the timer goes through a predetermined timing period wherein the contacts open and close during a "Timing" period. At the end of the timing operation under the control of the respective clutches the contacts are all in the "Time Out" condition. If at any time the clutch coil of a timer unit is deenergized the contacts immediately go back into their "Reset" condition.

The crusher control panel 115 is mounted on the front of the crusher assembly 111. Before the crusher control buttons and selector switches can become operative the main control switch 50 on main control panel 112 must be set to "Crush." When this switch is set to "Crush" switches 50A and 50D are closed energizing the crusher circuit making crushing operations possible. The "Auto-Hand" switch 84 selects manual or automatic operation of the crusher. The "Cycle Start" switch 87 and the "Emergency Return" switch 88 are the master controls for the crushing cycle. The feed selector switch 85 has two positions, "Timed" and "Continuous." When this selector switch 85 is set to "Timed" the crusher cycle is controlled by a definite timed cycle determined by the two timers 90T and 91T previously referred to. These timers can be set to give a timed automatic crushing cycle as desired.

When the switch 87 is depressed it energizes relay 25, through the lower contact of the switch 38 which is closed when the carrier assembly 205 for the crusher wheel 200 is in its upper position. It is assumed here that an automatic cycle will be carried out and that the switch 84 is set to "Auto" and the switch 85 to "Timed." With the switch 84 in "Auto" its lower contact is open. The switch 85 is closed in "Timed" condition. Energization of the relay 25 closes switch 25a constituting a holding circuit around the cycle start switch 87. Relay 25 also closes contact 25b energizing slide-down solenoid 236a to actuate the valve 236 to move the rack 230 inwardly to rapidly move the crusher assembly 205 downward. When the rack is retracted the switch 39 is closed by the arm 245.

The crusher roll 200 engages the grinding wheel and its downward motion is stopped taking up the lost motion in the carrier 205 and allowing the plunger 269 to slide into the notch in the insert 268 fixed to the nut 206 thus closing switch 40. When switches 39 and 40 are closed the timer circuit is energized through the closed upper contacts of the "Auto-Hand" switch 84. The motor 90 of timer 90T and the clutch 90c of timer 90T are energized and this timer immediately goes into "Timing" condition and closes switch 90e. Switch 90f remains closed in "Reset" condition of timer 90T. However, the timer contact 90d is set up to give a predetermined delay in the actuation of this switch. When switches 90e and 90f are closed switch 90e energizes relay 8 and closing switch 8a to start the slow wheelhead motor 8A to start the grinding wheel 110 into rotation at a slow crushing speed. Thus the grinding wheel and crusher roll are slowly brought up to speed. After a predetermined time interval the switch 90d closes. This switch energizes the clutch coil 91c for the timer 91T. When the clutch coil 91c is energized the timer 91T immediately goes into its "Timing" condition, closing switches 91d and 91f and opening switch 91e. Switch 91d energizes the motor 91 for the timer 91T. Switch 91e opens the circuit to the timer motor 90 for the timer 90T but leaves this timer in its "Timing" condition. Switch 91f energizes relay 7 to actuate switch 7a for the motor 7A thus starting the positive crusher feed in rotating shaft 212. After a predetermined interval as determined by the adjustment of the timer 91T this timer goes into its "Time Out" condition opening switches 91d and 91f. Opening switch 91d deenergizes the clutch coil 91c of the timer 91T and that timer will then go into its "Reset" condition. When switch 91f is opened crusher feed motor 7A stops and the positive crushing movement ceases. Switch 91e is closed again energizing the motor 91 for the timer 91T which has remained in its "Timing" condition.

The timer 90T remains in its "Timed" condition in accordance with its predetermined adjustment keeping the slow wheel motor 8A in rotation for a final truing or rounding out of the grinding wheel following which it returns to its "Reset" condition.

Switch 90f then opens deenergizing the crush cycle start relay 25 to open switch 25b, deenergizing the slide-down valve solenoid 236a and this valve is spring loaded to return to its previous position moving the rack 230 to rapidly raise the crusher carrier assembly 205.

When the crusher assembly reaches its upper position the rack 230 is fully extended. Switch 39 is opened in the crusher control circuit when the rack 230 begins its outward movement and switch 33 is closed in the grinding control circuit when the rack completes this movement and the crusher roll carrier 205 is raised a predetermined distance from the grinding wheel 110.

If the "Emergency Return" switch 88 is depressed and opened at any time the crusher assembly will immediately be returned to its upper position. Limit switch 38 is an over travel switch and controls a minimum size to which the grinding wheel can be crushed or the maximum down feed of the crusher roll 200. If it is actuated it closes the circuits to the over travel light 89 and opens the circuit to the crushing cycle.

Thus it is seen that with the selector switch set to "Crush" the "Auto-Hand" switch to "Auto," and the "Time Continuous" selector switch to "Time" the depression of the "Cycle Start" switch will result in a rapid lowering of the crusher wheel into contact with the grinding wheel through actuation of the air cylinder valve. The slow wheel crushing speed motor will immediately start and after a predetermined time delay the crusher feed starts and crushes to a depth determined by the setting of a timer. Then the crusher feed stops and the wheel will be trued through a clean up time as determined by another timer following which the crusher speed motor stops and the crusher roll returns to retracted position.

For manual operation the "Auto-Hand" selector switch is set to "Hand." Following this the "Cycle-Start" switch is closed bringing the crusher roll into yielding contact with the grinding wheel and starting the slow wheel motor 8A. With the switch 85 in open position the automatic operation will not proceed but by use of a handcrank attached to shaft 250 crushing can be manually accomplished. When it is desired to raise the carrier assembly 205 and the crusher roll 200 depression of the "Emergency Return" switch 88 will retract the crusher wheel. If the "Time-Continuous" switch 85 is set to "Continuous" the crushing operation will continue until either the overtravel switch 38 is actuated or the "Emergency Return" switch 68 is opened by the operator.

In the setting up of the grinding wheel mechanism for an automatic cycle the selector handle 176 and the hand wheel 181 (which serves to manually position the wheelhead 102 during setup) are used in conjunction with the adjustable dogs and the various travel lights. With the selector handle 176 in "Run" position, the ratchets and gears associated with the hand wheel 181 and lead screw 135 respectively are disengaged. Thus the hand wheel 181 is in free wheeling position making the wheelhead feed possible only through the automatic cycle. With the selector handle in "Set-Up" position ratchets 188 and ratchet gear 189 are engaged making it possible to move the wheelhead forward by means of the hand wheel 181. When the selector handle 176 is in "Neutral" position ratchets 188 and 187 are in engagement with ratchet wheel gears 189 and 190 respectively making it possible to move the wheelhead in both directions by means of the hand wheel 181 rotating the lead screw 135. As previously mentioned the cam actuated interlock 172 serves to lock the auxiliary nut 166, which duplicates the movement of the wheelhead assembly to the push rod 171 of the dog carrier 170. This cam is locked when the selector handle 176 is in either "Run" or "Set-Up" positions but the auxiliary nut 166 and push rod 171 are released from each other when the selector handle 176 is in "Neutral" position.

In the carrying out of the setup operation the selector handle 176 is first moved to "Neutral" position. This releases the interlock 172 and the spring 176 returns the dog carrier 170 to a set starting point, destroying any previous setup made and the return stop switch 37 is actuated. The rapid traverse light 56, the fast feed light 57 and slow feed light 58 will be lighted. The interlock cam 178 will have moved off the interlock switch 41 opening the circuit to the cycle start button 64. The cover to the switch housing 168 is then removed opening switch 42 also breaking the circuit to the cycle start switch 64. The hand wheel 181 is rotated and drives through the chain 182 to rotate the sprocket 184 and the lead screw 135, through the engaged ratchets to position the wheelhead 110 for the mounting of a new wheel or making a new setup. Wheel 181 is rotated until the grinding wheel is approximately two inches or less from the work.

The selector handle is then moved to "Run" position. This actuates the interlock 172 to lock the auxiliary nut 166 to the push rod 171. The interlock arm 178 has now actuated the switch 41 but the circuit to the cycle start switch 64 still remains broken by the safety cover switch 42. The ratchet and ratchet gears are all disengaged making it impossible to move the wheelhead by means of the hand wheel 181.

Selector handle 176 is now moved to "Set-Up" position. This keeps the interlock 172 still engaged and the interlock arm 178 is moved off of the switch 41 breaking the circuit to the cycle start switch 64 and the ratchets 187 and 188 are engaged making it possible to move the wheelhead in the forward direction only by rotation of the lead screw 135. The hand wheel 181 is rotated until the wheel is close to the workpiece. During this movement the feed screw 135 moves the auxiliary nut 166 forward carrying the push rod 171 and the dog carrier 170 a distance forward equal to the wheel movement. When the wheelhead has been positioned at the desired inward limit during rapid traverse the rapid traverse stop dog 191 is screwed out until the rapid traverse switch 34 is actuated. This will be indicated by the rapid traverse light 56 going out. Under automatic operation the rapid traverse stop switch 34 will deenergize the rapid traverse clutch, energize the fast feed clutch and stop the rapid traverse motor.

The hand wheel 181 is then rotated until the grinding wheel is moved forward to its desired fast feed position as determined by the operator. The fast feed stop dog 192 is screwed out until the fast feed stop switch 35 is actuated which is indicated by the fast feed light 57 going out. In the automatic grinding cycle the fast feed stop switch 35 will deenergize the fast feed clutch and energize the slow feed clutch.

Stop sleeve 156 is then longitudinally adjusted by release of the air clamp 164 by actuation of the lever 165 and then by turning of the hand wheel 158 by observation of the slow feed light 58 until the sleeve 156 is properly positioned to give the desired slow feed travel. During the automatic cycle the sleeve 156 will positively stop wheelhead feed, clutch 154 will slip and the positive stop switch 36 will energize the timer 79 as previously described. After a time delay the timer will deenergize the slow feed clutch, energize the rapid traverse clutch and start the rapid traverse motor in reverse. The timer 79 is set for the amount of spark out or sizing of the work desired.

After the setup has been completed the selector handle 176 is moved into "Run" condition. The hand wheel 181 is then inactive, the ratchet and ratchet gears are disengaged and the interlock arm 178 actuates the interlock switch 41. The cover to the switch housing 168 is replaced actuating the switch 42. Following this procedure the grinding machine is set up for its automatic grinding cycle.

Figures 21 and 22 illustrate the application of the auxiliary grinding wheels 106 and 107. During the automatic grinding operation by means of the main grinding wheel 110 these grinding wheels 106 and 107 must be retracted from the work to close the lower contacts of switches 30 and 31. Figure 21 illustrates at 300 an exemplary annular workpiece which has been ground by means of a grinding wheel 110 having a complementary configuration. Because of the nature of a crush dressing operation radial surfaces can not be readily fashioned on the grinding wheel and the work will of course have slanted surfaces corresponding thereto. In order to true up these outer slanted surfaces of the workpiece 300, the auxiliary grinding wheels 106 and 107 are provided and are each manually moved in to true up these slanted surfaces making them in a radial plane with the work axis as illustrated in Figure 22. The motor 3A drives auxiliary grinding wheel 106 and is controlled by stop switches 68A, 68B and start switches 67A and 67B through relay 3 and switch 3a. Motor 4A for driving wheel 107 is similarly controlled through stop switches 71A, 71B and start switches 70A, 70B through relay 4 and switch 4a.

Because of the adjustments provided in the automatic grinding cycle and the method employed for truing the grinding wheel the grinding machine is adapted for many different applications to give a rapid and cool grinding operation. Because of the advantageous timing cycle employed with its adjustable phase relationships grinding wheels of a wide range of characteristics and configurations can be readily trued or formed without danger of damage to either the grinding wheel or the crusher roll. With automatic compensating adjustments of the grinding wheel during either automatic or manual crushing the automatic grinding cycle can be immediately carried out following truing. The structure provided for the rapid and slow movements of the crusher roll is precise and reliable in its operation and ruggedly conformed for a long useful service life.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A crusher unit for truing the peripheral surface of a grinding wheel comprising a unit housing, a crusher roll, a crusher roll carrier, means rotatably mounting said crusher roll in said carrier, means guiding said carrier in said housing for movement toward and from the axis of a grinding wheel to be trued, nut means in said carrier, a shaft, said shaft having a threaded portion along its length threaded within said nut means, a splined portion along the length of said shaft, an internally splined gear engaging the splined portion of the shaft and rotatably carried in said housing, a first drive means operatively connected to drive said gear and rotate said shaft within said nut means for a slow positive feeding movement of the carrier and crusher roll during crush dressing, a threaded sleeve journaled about said shaft, means cooperating between said shaft and sleeve restraining them against relative axial movements and permitting relative rotation therebetween, means cooperating between said housing and said sleeve to prevent rotation of said sleeve, an internally threaded gear threaded about said sleeve and carried in said housing for rotation, a second drive means operatively connected to said internally threaded gear for rotation thereof to move said sleeve and shaft axially to rapidly advance the crusher roll carrier and move the crusher roll into engagement with the grinding wheel, lost motion means in said carrier responsive to engagement of the crusher roll with the grinding wheel, and switch means responsive to said lost motion means for energizing said first drive means for crushing of the wheel surface.

2. The crusher unit of claim 1 wherein said second drive means comprises a rack in driving relationship with said gear and means operatively connected to said rack for reciprocation thereof.

3. The crusher unit of claim 2 wherein the means to reciprocate said rack comprises a cylinder, a piston operating in said cylinder and operatively connected to said rack, fluid supply conduits communicating with each end of said cylinder and valve means in said conduits for controlling the direction of movement of said piston.

4. The crusher unit of claim 3 wherein further adjustable valve means are provided in said conduits for setting the rate of reciprocation of said piston in either direction.

5. A crusher unit for truing the peripheral surface of a grinding wheel comprising a unit housing, a crusher roll, a crusher roll carrier, means mounting said crusher roll in said carrier for rotation, means guiding said carrier in said housing for movement toward and from the axis of a grinding wheel to be trued, nut means in said carrier, a shaft having a threaded portion along its length threaded within said nut means, means cooperating between the housing and said shaft to axially reciprocate the shaft in the housing for rapid movement of the crusher roll toward and from the grinding wheel, said shaft having a splined portion along its length, an internally splined gear engaging the splined portion of the shaft and rotatably carried in said housing, a drive motor, means operatively connecting said drive motor to said gear including releasable clutch means, and manually drivable means operatively connected to said gear whereby upon release of said clutch means said gear can be manually rotated to rotate said shaft within said nut means to move said carrier and crushing roll toward the axis of a grinding wheel in a crushing operation.

6. A grinding machine comprising a base, a grinding wheel, a crusher wheel, work positioning means carried from said base, carrier means carried from said base including means for automatic sequential movement of said grinding wheel toward and from said work positioning means in a grinding operation, means supporting said grinding wheel and said crusher wheel from said carrier means for rotation and relative approach and separation of the wheel axes, slow speed crushing drive means operatively connected to rotate one of said wheels, manually actuated means associated with said supporting means for causing relative approach of the wheel axes under forceful engagement in a crushing operation, and compensating means operatively connected between said manually acuatable means and said carrier for advancing said grinding wheel toward said work locating means during said forceful engagement and in accordance with the crushing movement of said manually actuatable means.

7. A grinding machine comprising a base, a work-positioning means, a grinding wheel, means mounting said work positioning means from said base, carrier means carrying said grinding wheel from said base for rotation and for movement toward and from said work positioning means including means for automatic sequential movement of said carrier means and a cyclic grinding operation, a crusher roll, means supporting said crusher roll from said carrier means for rotation and for movement toward and from the wheel axis for crushing, slow speed crusher drive means operatively connected for rotation of said grinding wheel, actuating means associated with said supporting means for causing movement of the crusher roll toward the grinding wheel axis under forceful engagement in a crushing operation, a drive motor for driving said actuating means, manually driven means connected to said actuating means, and an operative connection between said actuating means and said carrier means whereby said carrier means is advanced toward said work positioning means during said forceful engagement and in accordance with the amount of crushing performed on the grinding wheel under either drive motor or manual energization.

8. A grinding machine comprising a base, work positioning means, a grinding wheel, means carrying said work positioning means and said grinding wheel from said base for relative movement toward and from one another, operating means operatively connected to said carrying means for carrying out an automatic cyclic grinding operation, a grinding wheel truing unit carried from said base and comprising a unit housing, a crusher roll, a crusher roll carrier, means mounting said crusher roll in said carrier for rotation, means guiding said carrier in said housing for movement toward and from the axis of the grinding wheel, a nut means in said carrier, a shaft with a threaded portion along its length threaded within said nut means, means cooperating between the housing and said shaft to axially position the shaft in the housing, actuating means operatively connected to said shaft for rotation thereof within said nut means to advance said carrier and said crusher roll toward the grinding wheel axis for crushing, manually driven means operatively connected to said crushing actuating means for manual rotation of said shaft and crushing, and compensating means operatively interconnecting said crushing actuating means and said grinding cycle operating means to compensate the grinding wheel position relative to the work positioning means in accordance with the amount of the grinding wheel surface crushed away in the truing operation.

9. A grinding machine comprising a base, work positioning means, a grinding wheel, means carrying said work positioning means and said grinding wheel from said base for relative movement toward and from one another in a grinding operation, a drive means operatively connected to said carrying means for carrying out an automatic cyclic grinding operation, a grinding wheel truing unit carried from said base comprising a unit housing, a crusher roll, a crusher roll carrier, means mounting said crusher roll in said crusher roll carrier for rotation, means guiding said crusher roll carrier in said housing for movements of said crusher roll toward and from the axis of said grinding wheel, nut means in said carrier, a shaft having a threaded portion along its length threaded within said nut means, means cooperating between the housing and said shaft to axially position the shaft in the housing, actuating means operatively connected to said shaft for rotation thereof within said nut means to advance said carrier and crusher roll toward the grinding wheel for crushing, manually driven means connected to said crushing actuating means for rotation of said shaft, a drive motor, means operatively connecting said drive motor to said crushing actuating means for rotation of said shaft, said operative connection including a clutch means, and compensating means operatively interconnecting said crushing actuating means and said grinding cycle drive means to compensate the grinding wheel position relative to the work positioning means in accordance with the amount of the grinding wheel surface crushed away in a truing operation.

10. A crushing unit for truing the peripheral surface of a grinding wheel comprising a unit housing, a crusher roll, a crusher roll carrier, means mounting said crusher roll in said carrier for rotation, means guiding said carrier for movement in said housing toward and from the axis of a grinding wheel to be crushed, a shaft, means operatively connecting said shaft to said carrier for relative axial movement therebetween upon rotation of said shaft, actuating means cooperating between said housing and said shaft for axial reciprocation of said shaft and carrier together and for positioning the shaft in said housing, drive means operatively connected for rotation of said shaft for slow positive movement of said carrier and crusher roll during crushing of a grinding wheel, further drive means operatively connected to said actuating means for rapidly reciprocating said shaft to rapidly engage the crusher roll with a grinding wheel to be crushed and rapidly disengaging it therefrom upon completion of a crushing operation, switch means operatively associated between said housing and said crusher roll carrier responsive to engagement of the crusher roll with a grinding wheel to be crushed and to positions of the crusher roll carrier within the housing, automatic circuit means associated with said switch means and both said drive means for carrying out an automatic cyclic crushing operation, said circuit means including adjustable time clock means whereby the various phases of the cyclic crushing operation can be timed relatively as desired.

11. A crushing unit for truing the peripheral surface of a grinding wheel comprising a unit housing, a crusher roll, a crusher roll carrier, means mounting said crusher roll in said carrier for rotation, means guiding said carrier in said housing for movement toward and from the axis of a grinding wheel to be trued, nut means in said carrier, a shaft, a threaded portion along said shaft threaded within said nut means, a splined portion along the length of said shaft, an internally splined gear engaging the splined portion of the shaft and rotatably carried in the housing, drive means operatively connected to said gear for driving said gear to rotate said shaft within said nut means for a slow positive feeding movement of the carrier and crusher roll during crushing of a grinding wheel, a sleeve journaled about said shaft having an external threaded surface, means cooperating between said shaft and said sleeve restraining these components against relative axial movement and permitting relative rotation therebetween, means cooperating between said housing and said sleeve to prevent rotation of said sleeve, an internally threaded gear threaded about said sleeve and carried in said housing for rotation, drive means operatively connected to said internally threaded gear for rotation of said gear and axial movements of said shaft and crusher roll carrier together to rapidly engage the crusher roll with a grinding wheel to be crushed and rapidly disengage it therefrom upon completion of crushing operation, switch means operatively associated between said housing and said crusher roll carrier responsive to engagement of the crusher roll of the grinding wheel to be crushed and to positions of the crusher roll carrier within the housing, automatic circuit means associated with said switch means and both said drive means for carrying out an automatic cyclic crushing operation, said circuit means including adjustable time clock means whereby the various phases of the cyclic crushing operation can be timed relatively as desired.

12. A crusher unit for truing the peripheral surface of a grinding wheel comprising a unit housing, a crusher roll, a crusher roll carrier guided in said housing for movement toward and from a grinding wheel to be crushed, an operating shaft carried in said housing for rotation and bodily axial movement, screw thread means cooperating between said shaft and said carrier including nut means having lost motion relative to the carrier, a first power means operatively connected to rotate said shaft within said nut means for slow feed of the carrier and crusher roll, second screw thread means cooperating between said housing and said shaft for axial movement of said shaft to rapidly move the crusher roll relative to the grinding wheel, second power means connected to drive said second screw thread means, switch means cooperating between said nut and said carrier and responsive to taking up of the lost motion therebetween upon engagement of the roll with the wheel for starting said first power means for slow feed of the crusher roll to crush the grinding wheel surface.

13. A grinding machine comprising a base, work positioning means on said base, a grinding wheel, a wheelhead mounted on said base for movement relative to said work positioning means, drive means cooperating between said base and said wheelhead for feed movement of said grinding wheel, first power means connected to said drive means, control means connected to said power means for automatic feed movement of said wheelhead through sequential grinding phases of relatively different rates and adjustable extents, a crusher roll mounted on said wheelhead for movement relative to said grinding wheel for forming thereof, second power means for moving said crusher roll through a first clearance phase into engagement with said wheel and a second crush forming phase, and a drive interconnection between said second power means and said drive means operative only during said second crushing phase for moving said wheelhead toward said work positioning means during wheel forming and in accordance with the reduction in wheel diameter.

14. A grinding machine comprising a base, work positioning means on said base, a grinding wheel, a wheelhead mounted on said base for movement relative to said work positioning means, drive means cooperating between said base and said wheelhead for feed movement of said grinding wheel, power means connected to said drive means, control means connected to said power means for automatic feed movement of said wheelhead through sequential grinding phases of relatively different rates and adjustable extents, a crusher roll mounted on said wheelhead for movement relative to said grinding wheel for forming thereof, first power driven actuating means for moving said crusher roll through a first clearance phase into engagement with said wheel, second power driven actuating means for moving said roll through a second crush forming phase, and a drive interconnection between said second actuating means and said drive means operative only during said second crushing phase for moving said wheelhead toward said work positioning means during wheel forming and in accordance with the reduction in wheel diameter.

References Cited in the file of this patent

UNITED STATES PATENTS

| | | |
|---|---|---|
| 396,077 | Flather | Jan. 15, 1889 |
| 1,993,830 | Conover | Mar. 12, 1935 |
| 2,014,768 | Klingele | Sept. 17, 1935 |
| 2,334,581 | Pyne | Nov. 16, 1943 |
| 2,446,105 | Polk | July 27, 1948 |
| 2,469,077 | Rickenmann | May 3, 1949 |
| 2,545,730 | Fouquet | Mar. 20, 1951 |
| 2,576,239 | Reimschissel et al. | Nov. 27, 1951 |
| 2,652,661 | Flangers et al. | Sept. 22, 1951 |
| 2,720,062 | Fouquet | Oct. 11, 1955 |

FOREIGN PATENTS

| | | |
|---|---|---|
| 644,744 | Great Britain | Oct. 18, 1950 |